(12) United States Patent
Park et al.

(10) Patent No.: US 9,805,450 B2
(45) Date of Patent: Oct. 31, 2017

(54) IMAGE PROCESSING DEVICE AND DISPLAY DEVICE HAVING THE SAME

(71) Applicant: Samsung Display Co., Ltd., Yongin, Gyeonggi-Do (KR)

(72) Inventors: Mun-San Park, Hwaseong-si (KR); Cheolwoo Park, Suwon-si (KR); Yunki Baek, Suwon-si (KR); Kyoungju Shin, Hwaseong-si (KR); Eunho Lee, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 986 days.

(21) Appl. No.: 13/873,588

(22) Filed: Apr. 30, 2013

(65) Prior Publication Data

US 2014/0184653 A1 Jul. 3, 2014

(30) Foreign Application Priority Data

Dec. 28, 2012 (KR) .................. 10-2012-0157344

(51) Int. Cl.
*G06T 5/20* (2006.01)
*G06T 5/00* (2006.01)
*G09G 3/20* (2006.01)

(52) U.S. Cl.
CPC .............. *G06T 5/20* (2013.01); *G06T 5/002* (2013.01); *G06T 2207/20192* (2013.01); *G09G 3/20* (2013.01)

(58) Field of Classification Search
CPC .................................. G09G 5/37; G09G 3/20
USPC .................. 382/275; 345/204, 690; 348/625
See application file for complete search history.

(56) References Cited

U.S. PATENT DOCUMENTS

| | | | |
|---|---|---|---|
| 5,430,497 A * | 7/1995 | Strolle | H04N 5/142 348/571 |
| 5,920,357 A | 7/1999 | Ohara | |
| 6,697,540 B1 | 2/2004 | Chen | |
| 6,823,086 B1 * | 11/2004 | Dolazza | G06T 5/002 348/610 |

(Continued)

FOREIGN PATENT DOCUMENTS

| | | |
|---|---|---|
| KR | 1020010087949 A | 9/2001 |
| KR | 1020060002248 A | 1/2006 |

(Continued)

OTHER PUBLICATIONS

Max-Min Filter, Oct. 6, 2011, Robo realm vision for machines, www.roborealm.com/help/maxminusmin.php.*

(Continued)

*Primary Examiner* — Grant Sitta
(74) *Attorney, Agent, or Firm* — Cantor Colburn LLP

(57) ABSTRACT

An image processing device includes a first filter that filters the image signal to output a first image signal, a second filter that converts the image signal corresponding to a predetermined pixel to a second image signal based on image signals corresponding to a plurality of peripheral pixels adjacent to the predetermined pixel, a third filter that filters the second image signal from the second filter to output a third image signal, a fourth filter that filters the third image signal from the third filter to output a fourth image signal, and an image synthesizer that synthesizes the first image signal from the first filter and the fourth image signal from the fourth filter.

8 Claims, 9 Drawing Sheets

(56) References Cited

U.S. PATENT DOCUMENTS

| | | | |
|---|---|---|---|
| 6,973,219 B2* | 12/2005 | Avinash | G06T 5/002 358/3.26 |
| 7,212,686 B2 | 5/2007 | Someya et al. | |
| 7,289,667 B2 | 10/2007 | Nenonen et al. | |
| 7,400,775 B2 | 7/2008 | Ikeda et al. | |
| 7,420,623 B2 | 9/2008 | Nakakuki | |
| 7,430,336 B2 | 9/2008 | Raveendran | |
| 7,626,639 B2* | 12/2009 | Yamauchi | H04N 5/21 348/607 |
| 7,840,089 B2* | 11/2010 | Ho | G06T 5/004 382/263 |
| 7,843,498 B2 | 11/2010 | Takahashi et al. | |
| 7,936,941 B2* | 5/2011 | Sumiya | G06T 5/20 382/260 |
| 8,050,509 B2* | 11/2011 | Jeong | G06K 9/40 382/254 |
| 8,199,257 B2* | 6/2012 | Lien | H04N 5/142 348/607 |
| 8,224,123 B2 | 7/2012 | Hamada et al. | |
| 8,331,717 B2* | 12/2012 | Hou | H04N 19/176 348/465 |
| 2005/0135700 A1* | 6/2005 | Anderson | G06T 5/002 382/261 |
| 2005/0185071 A1 | 8/2005 | Takahashi et al. | |
| 2006/0039622 A1* | 2/2006 | Casale | H04N 5/208 382/266 |
| 2007/0009170 A1* | 1/2007 | Lin | G06T 5/50 382/260 |
| 2007/0097267 A1* | 5/2007 | Sakurai | H04N 5/217 348/571 |
| 2007/0171310 A1* | 7/2007 | Arici | H04N 5/20 348/687 |
| 2007/0247532 A1* | 10/2007 | Sasaki | H04N 1/409 348/231.99 |
| 2009/0052765 A1* | 2/2009 | Toyoda | G06K 9/00 382/149 |
| 2010/0027905 A1* | 2/2010 | Zhang | G06T 5/002 382/261 |
| 2011/0134093 A1* | 6/2011 | Chen | G09G 3/3685 345/211 |
| 2011/0261152 A1 | 10/2011 | Kasahara | |
| 2011/0267540 A1 | 11/2011 | Nakatsuka et al. | |
| 2012/0019869 A1* | 1/2012 | Jonsson | G06T 5/008 358/2.1 |
| 2012/0200748 A1* | 8/2012 | Utsugi | G06T 5/002 348/241 |
| 2013/0148893 A1* | 6/2013 | Markham | G06K 9/3241 382/190 |
| 2013/0287265 A1* | 10/2013 | Nepomniachtchi | G06K 9/00442 382/115 |
| 2015/0023611 A1* | 1/2015 | Salvador | G06T 3/4053 382/263 |

FOREIGN PATENT DOCUMENTS

| | | |
|---|---|---|
| KR | 1020070018606 A | 2/2007 |
| KR | 1020070079215 A | 8/2007 |
| KR | 1020100117457 A | 11/2010 |

OTHER PUBLICATIONS

Cho, et al., "Edge-Adaptive Local Min/Max Nonlinear Filter-Based Shoot Suppression", IEEE Transactions on Consumer Electronics, vol. 52, No. 3, Aug. 2006 pp. 1107-1111.

* cited by examiner

| A1 | A2 | A3 |
|----|----|----|
| A4 | A5 | A6 |
| A7 | A8 | A9 |

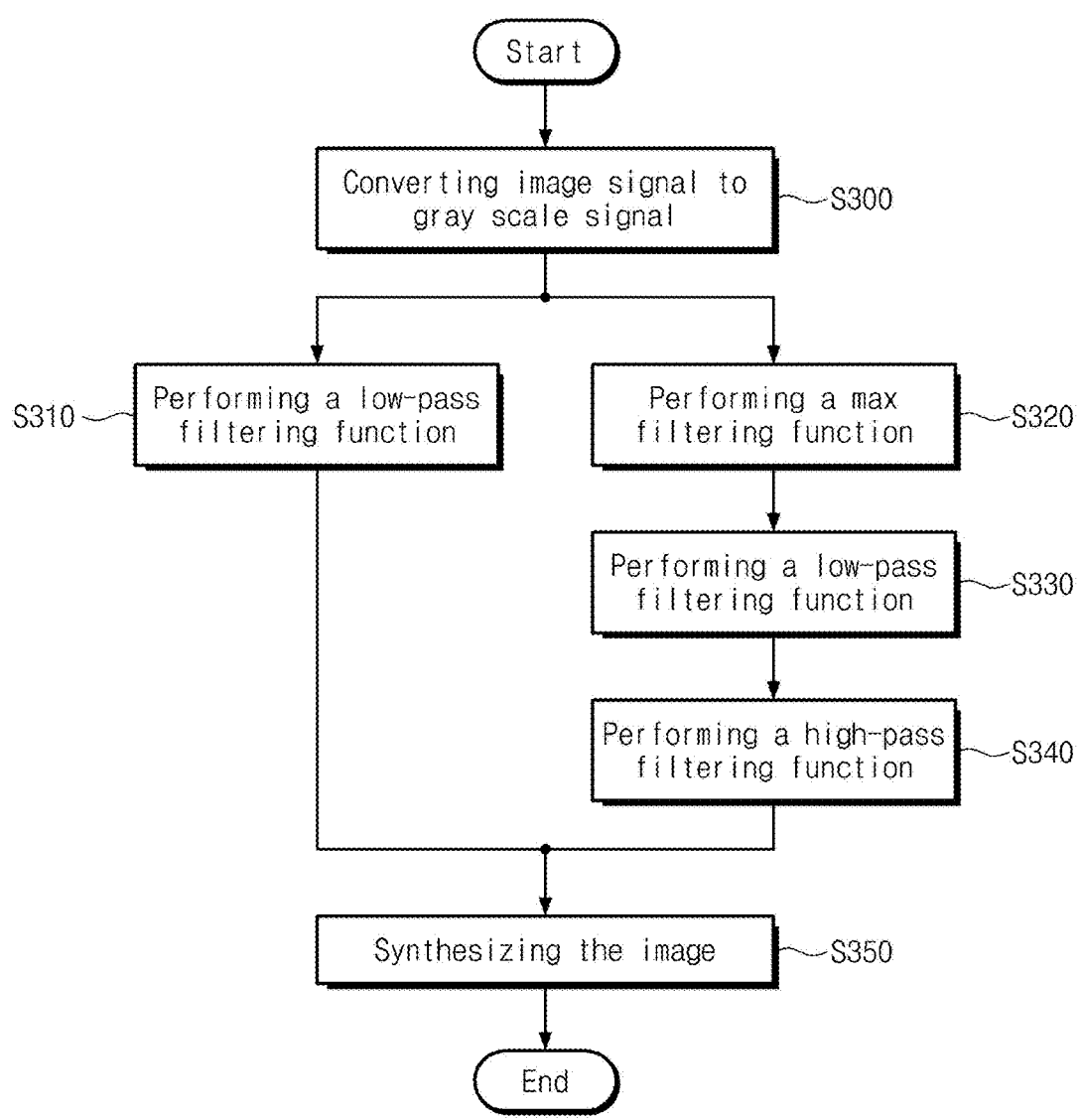

IMAGE PROCESSING DEVICE AND DISPLAY DEVICE HAVING THE SAME

This application claims priority to Korean Patent Application No. 10-2012-0157344, filed on Dec. 28, 2012, and all the benefits accruing therefrom under 35 U.S.C. §119, the content of which in its entirety is herein incorporated by reference.

BACKGROUND

1. Field

The disclosure relates to an image processing device and a display device including the image processing device.

2. Discussion of Related Art

In recent years, a display device is widely used in various fields, such as a personal computer, a notebook computer, a mobile communication device, a high-definition television, etc. In the display device, a method of enhancing a boundary, e.g., an edge, of an object included in an image signal may be used to improve display quality of an image displayed in the display device. When the edge of the object is enhanced, a dummy data may be enhanced, and thus artifacts may occur at the edge of the object.

In the display device, a method of filtering the image signal may be used to pass a signal having a specific bandwidth to remove a noise component included in the image signal.

When noise attenuation becomes substantially high while the noise component is removed, the artifacts may be reduced at the edge of the object, but blurring may be intensified on a small size character, a fine line like hair, a boundary of a pupil, etc.

SUMMARY

The disclosure provides an image processing device with improved image display quality.

The disclosure provides a display device including the image processing device.

An exemplary embodiment of the invention provides an image processing device including a first filter, a second filter, a third filter, a fourth filter, and an image synthesizer. In such an embodiment, the first filter filters an image signal to output a first image signal, the second filter converts the image signal corresponding to a predetermined pixel to a second image signal based on image signals corresponding to a plurality of peripheral pixels adjacent to the predetermined pixel. In such an embodiment, the third filter filters the second image signal from the second filter to output a third image signal, the fourth filter filters the third image signal from the third filter to output a fourth image signal, and the image synthesizer synthesizes the first image signal from the first filter and the fourth image signal from the fourth filter.

In an exemplary embodiment of the invention, the first filter may include a first low-pass filter, and the third filter may include a second low-pass filter.

In an exemplary embodiment of the invention, the first low-pass filter may have a cut-off frequency higher than a cut-off frequency of the second low-pass filter.

In an exemplary embodiment of the invention, the second filter may include a max filter.

In an exemplary embodiment of the invention, the max filter may output an image signal having the largest gray scale value among the image signals corresponding to the predetermined pixel and the peripheral pixels adjacent to the predetermined pixel as the second image signal.

In an exemplary embodiment of the invention, the max filter may output an image signal having the largest gray scale value among the image signals corresponding to three-by-three pixels, in which the predetermined pixel is located at a center portion, as the second image signal.

In an exemplary embodiment of the invention, the fourth filter may include a high-pass filter.

In an exemplary embodiment of the invention, the image processing device may further include a gray scale converter which coverts an input image signal including red, green and blue data to a gray scale signal.

An exemplary embodiment of the invention provides a display device including a display panel which includes a plurality of gate lines, a plurality of data lines, and a plurality of pixels, where each of the pixels is connected to a corresponding gate line of the gate lines and a corresponding data line of the data lines, a gate driver which drives the gate lines, a data driver which drives the data lines, and a timing controller which receives an image signal, applies a data signal and a first control signal to the data driver, and applies a second control signal to the gate driver. In such an embodiment, the timing controller includes an image processing device to convert the image signal to the data signal, and the image processing device includes a first filter which filters the image signal to output a first image signal, a second filter which converts the image signal corresponding to a predetermined pixel to a second image signal based on image signals corresponding to a plurality of peripheral pixels adjacent to the predetermined pixel, a third filter which filters the second image signal from the second filter to output a third image signal, a fourth filter which filters the third image signal from the third filter to output a fourth image signal, and an image synthesizer which synthesizes the first image signal from the first filter and the fourth image signal from the fourth filter.

According to exemplary embodiments, the noise component included in the image is attenuated and the edge of the object is enhanced. In such embodiments, although the noise component included in the image is attenuated, the blurring on images of a small size character, a fine line like hair, and the boundary of a pupil is effectively prevented.

BRIEF DESCRIPTION OF THE DRAWINGS

The above and other features of the invention will become readily apparent by reference to the following detailed description when considered in conjunction with the accompanying drawings, in which:

FIG. 9 is a flowchart showing an exemplary embodiment of an image processing method of the timing controller shown in FIG. 1.

DETAILED DESCRIPTION

Figure 1:
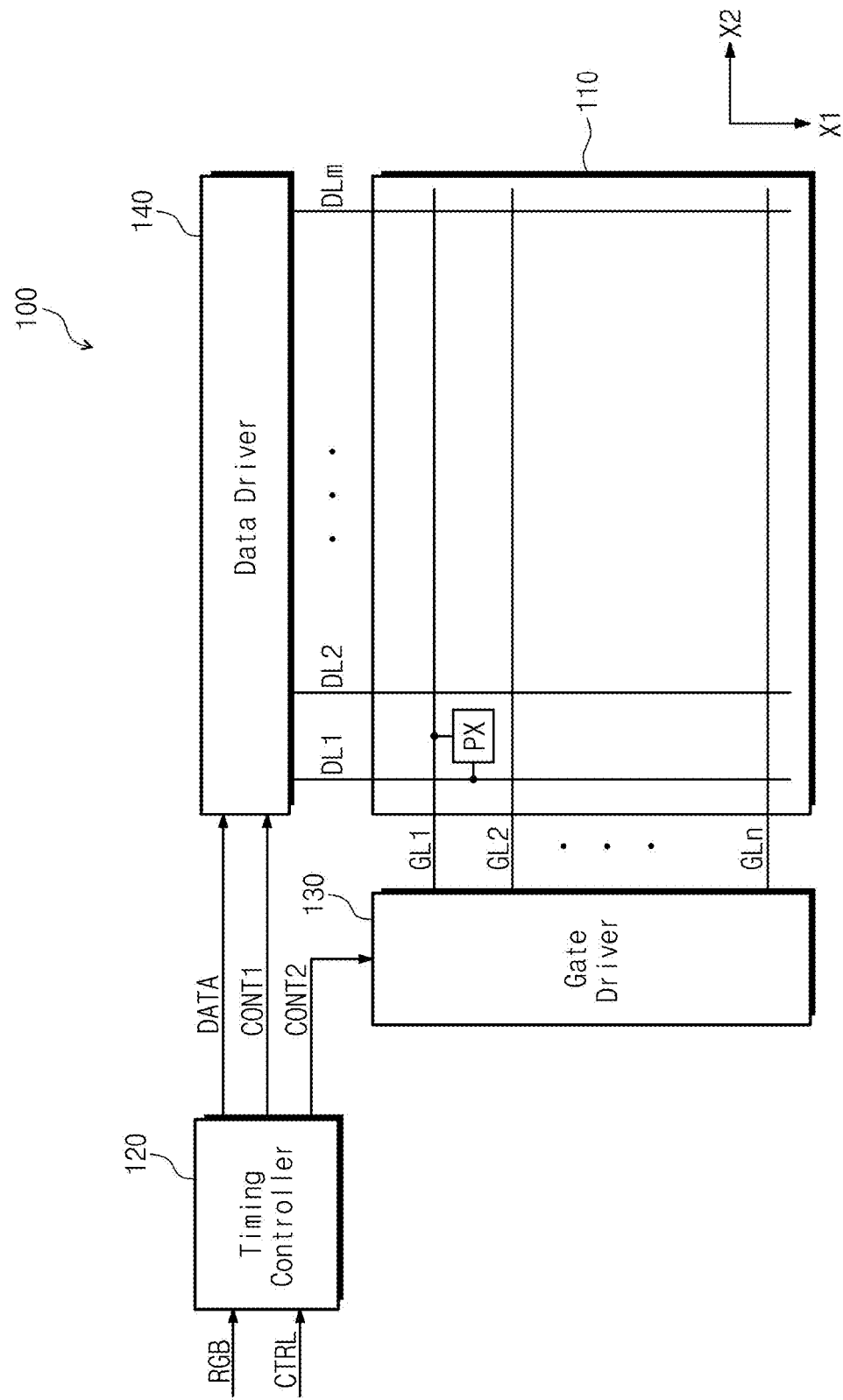
FIG. 1 is a block diagram showing an exemplary embodiment of a display device according to the invention.

The invention will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be described in detail with reference to the accompanying drawings.

FIG. 1 is a block diagram showing an exemplary embodiment of a display device according to the invention.

Referring to FIG. 1, a display device 100 includes a display panel 110, a timing controller 120, a gate driver 130 and a data driver 140.

The display panel 110 includes a plurality of data lines DL1 to DLm that extend substantially in a first direction X1, a plurality of gate lines GL1 to GLn that extend substantially in a second direction X2 and cross the data lines DL1 to DLm, and a plurality of pixels PX connected to the data lines DL1 to DLm and the gate lines GL1 to GLn. In an exemplary embodiment, the pixels may be arranged in areas defined in association with the data lines DL1 to DLm and the gate lines GL1 to GLn. The data lines DL1 to DLm are insulated from the gate lines GL1 to GLn.

Although not shown in FIG. 1, each pixel PX includes a switching transistor connected to a corresponding data line of the data lines DL1 to DLm and a corresponding gate line of the gate lines GL1 to GLn, a liquid crystal capacitor connected to the switching transistor, and a storage capacitor connected to the switching transistor.

The timing controller 120 receives image signals RGB and control signals CTRL, e.g., a vertical synchronization signal, a horizontal synchronization signal, a main clock signal, a data enable signal, etc., to control the image signals RGB. The timing controller 120 converts the image signal RGB to data signal DATA using the control signals CTRL based on an operation condition of the display panel 110. The timing controller 120 applies the data signal DATA and a first control signal CONT1 to the data driver 140 and applies a second control signal CONT2 to the gate driver 130. The first control signal CONT1 includes a horizontal synchronization start signal, a clock signal and a line latch signal, and the second control signal CONT2 includes a vertical synchronization start signal and a gate pulse signal.

The data driver 140 outputs data output signals to drive the data lines DL1 to DLm in response to the data signal DATA and the first control signal CONT1 from the timing controller 120.

The gate driver 130 drives the gate lines GL1 to GLn in response to the second control signal CONT2 from the timing controller 120. In an exemplary embodiment, the gate driver 130 includes one or more gate driver integrated circuits ("IC"s), but not being limited thereto. In an alternative exemplary embodiment, the gate driver 130 may be configured to include a circuit including oxide semiconductor, amorphous semiconductor, crystalline semiconductor or polycrystalline semiconductor.

In an exemplary embodiment, the timing controller 120 removes noise components included in the image signals RGB and enhances a boundary of an object, e.g., an edge of the object, such that display quality of an image displayed in the display panel 110 is substantially improved. The data signal DATA provided to the data driver 140 from the timing controller 120, is an image signal in which the edge is enhanced.

Figure 2:
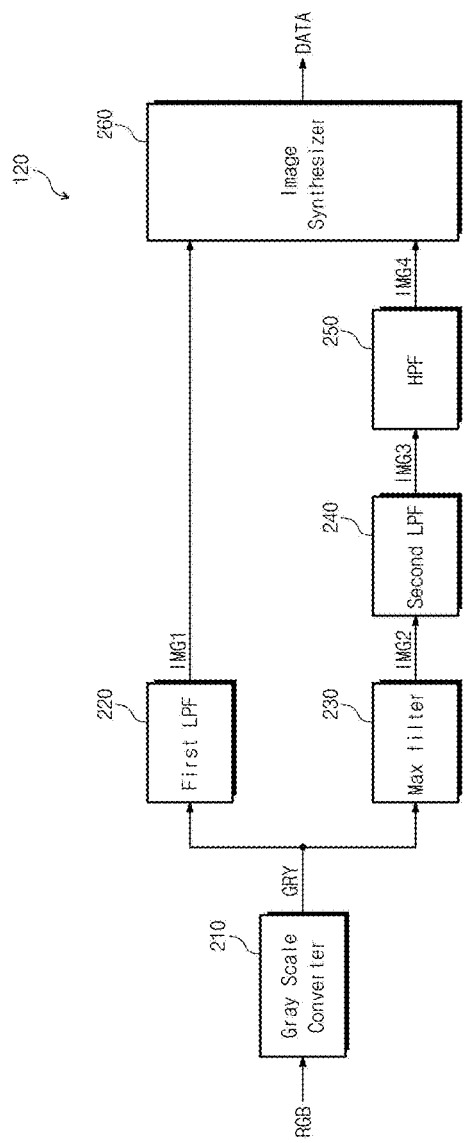
FIG. 2 is a block diagram showing an exemplary embodiment of a timing controller shown in FIG. 1.

FIG. 2 is a block diagram showing an exemplary embodiment of a timing controller shown in FIG. 1.

Referring to FIG. 2, the timing controller 120 includes a gray scale converter 210, a first low-pass filter 220 (referred to as "first LPF" in FIG. 2), a max filter 230, a second low-pass filter 240 (referred to as "second LPF" in FIG. 2), a high-pass filter 250 (referred to as "HPF" in FIG. 2) and an image synthesizer 260.

The gray-scale converter 210 converts the image signals RGB from an external source (not shown) to a gray scale signal GRY. The image signals RGB include a red data R, a green data G and a blue data B. When a weight is multiplied by each of the red data R, the green data G and the blue data B, the image signals RGB may be represented as gray scale levels.

In an exemplary embodiment, the gray scale signal GRY may be calculated by giving the more weight to colors, which are relatively sensitive to the human eye. In one exemplary embodiment, for example, the gray scale signal GRY may be R×0.299+G×0.587+B×0.114 or R×0.2126+G× 0.7152+B×0.072.

The gray scale signal GRY output from the gray scale converter 210 is applied to the first low-pass filter 220 and the max filter 230. The first low-pass filter 220 passes only a low frequency component of the gray scale signal GRY and thereby outputs a first image signal IMG1. The first image signal IMG1 output from the first low-pass filter 220 is applied to the image synthesizer 260.

The max filter 230 receives the gray scale signal GRY from the gray scale converter 210 and outputs a second image signal IMG2. The max filter 230 outputs the gray scale signal GRY, which has the greatest gray scale value among gray scale signals corresponding to a predetermined pixel and a plurality of peripheral pixels adjacent to the predetermined pixel, as the second image signal IMG2.

The second low-pass filter 240 receives the second image signal IMG2 from the max filter 230. The second low-pass filter 240 passes only a low frequency component of the second image signal IMG2 and thereby outputs a third image signal IMG3. A cut-off frequency of the second low-pass filter 240 may be lower than a cut-off frequency of the first low-pass filter 220.

The high-pass filter 240 receives the third image signal IMG3 from the second low-pass filter 240. The high-pass filter 240 passes only a high frequency component of the third image signal IMG3 and thereby outputs a fourth image signal IMG4. In an exemplary embodiment, the high-pass filter 250 may be a Sobel filter or a Laplacian filter and perform an edge extraction. The fourth image signal IMG4 output from the high-pass filter 250 is applied to the image synthesizer 260.

The image synthesizer 260 synthesizes the first image signal IMG1 from the first low-pass filter 220 and the fourth image signal IMG4 from the high-pass filter 250 to output the data signal DATA. In such an embodiment, the image synthesizer 260 synthesizes the first and second image signals IMG1 and IMG4, which are represented in gray scales, and then restores the synthesized image signal to RGB colors, to thereby output the data signal DATA.

Figures 3, 4:
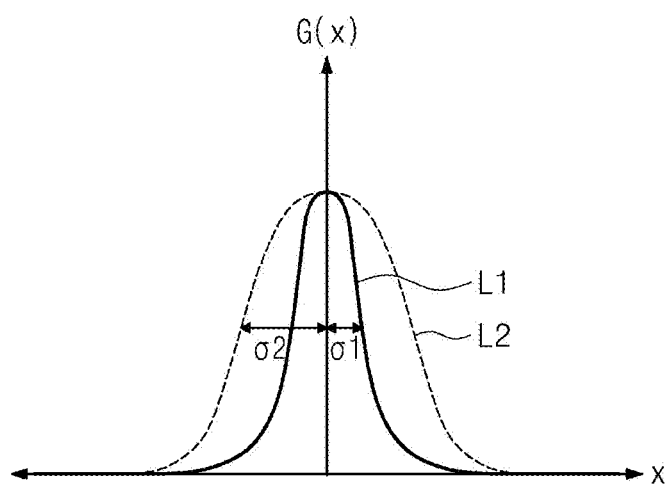
FIG. 3 is a graph showing a transmission property of an exemplary embodiment of a first low-pass filter and a second low-pass filter shown in FIG. 2.
FIG. 4 is a diagram showing an operation of an exemplary embodiment of a max filter shown in FIG. 2.

FIG. 3 is a graph showing a transmission property of an exemplary embodiment of the first low-pass filter and the second low-pass filter shown in FIG. 2 where the first and second low-pass filters are realized by a Gaussian filter.

Referring to FIGS. 2 and 3, the Gaussian filter is used to cause a blur effect. The Gaussian filter represented by a one-dimensional function is as the following Equation 1.

$$G(x) = \frac{1}{\sqrt{2\pi}\, e} e^{-\frac{x^2}{2\sigma^2}} \qquad \text{Equation 1}$$

In Equation 1, σ denotes a width of a Gaussian graph, and $$\frac{1}{\sqrt{2\pi}}$$

denotes a height of the Gaussian graph.

Since the image displayed in the display panel 110 is a two-dimensional image, Equation 1 represented by a two-dimensional function is as the following Equation 2.

$$G(x, y) = \frac{1}{2\pi e^2} e^{-\frac{x^2+y^2}{2\sigma^2}} \qquad \text{Equation 2}$$

Since the Gaussian filter gives a more weight to a data of a pixel disposed relatively closer to a present pixel than a data of a pixel disposed relatively distant from the present pixel, the Gaussian filter may remove the noise component without crumbling the edge of the object to be displayed.

In an exemplary embodiment, the cut-off frequency of the first low-pass filter 220 is higher than the cut-off frequency of the second low-pass filter 240. The cut-off frequency of the first low-pass filter 220 is set to be high such that the first low-pass filter 220 removes the noise component of the image and the loss of the image to be displayed in the display panel 110 is substantially reduced. The second low-pass filter 240 causes attenuation in a wider bandwidth than the first low-pass filter 220 and has the degree of attenuation higher than the degree of attenuation of the first low-pass filter 220 with respect to the noise component. Therefore, the second low-pass filter 240 has a gentle filtering curve when compared to a filtering curve of the first low-pass filter 220. In such an embodiment, the second low-pass filter 240 has a width (σ2) wider than a width (σ1) of the first low-pass filter 220. In an exemplary embodiment, the first and second low-pass filters 220 and 240 may be configured to include a digital filter, and filtering curves L1 and L2 of the first and second low-pass filters 220 and 240 may be changed by changing the number of taps.

Due to the first low-pass filter 220 having the high cut-off frequency, the loss of the image is substantially reduced, and thus the loss in image of a small size character, a fine line (e.g., an image of hair) and a boundary of a pupil, for example, are effectively minimized. The second low-pass filter 240 having the low cut-off frequency may secure high noise attenuation effect, but few blurring artifacts may occur by the second low-pass filter 240 at images of the small size character, the fine line and the boundary of a pupil, for example.

FIG. 4 is a diagram showing an operation of an exemplary embodiment of the max filter shown in FIG. 2.

Referring to FIGS. 2 and 4, the max filter 230 sets the image signal of the pixel A5 disposed at a center portion to a maximum value in a three-by-three kernel, that is, the maximum value of the pixel A5' is equal to Maximum {A1~A9}.

Figure 5A:
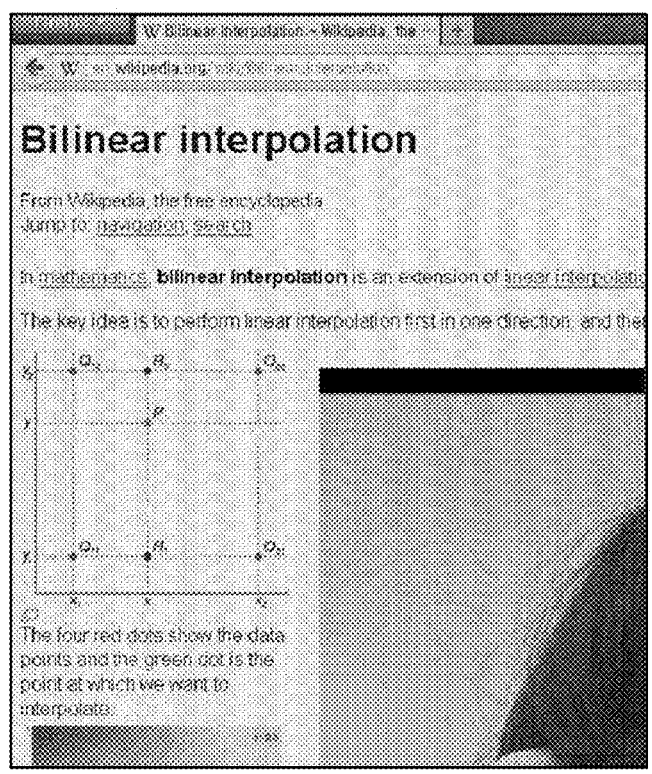
FIGS. 5A and 5B are views showing an input image input to the max filter shown in FIG. 2 and an output image output from the max filter shown in FIG. 2, respectively.
Figure 5B:

FIGS. 5A and 5B are views showing an input image input to the max filter shown in FIG. 2 and an output image output from the max filter shown in FIG. 2, respectively.

Referring to FIGS. 2, 5A and 5B, the gray scale signal GRY of a frame, which is input to the max filter 230, may include an image and texts with various sizes. As shown in FIG. 5B, an image and a text, which are smaller than a predetermined size, are removed from the image output from the max filter 230. In one exemplary embodiment, for example, a gray scale value of a white color and a gray scale value of a black color may be 255 and zero (0), respectively. When the pixel A5 has the gray scale value of zero (0) corresponding to the text and any one of the peripheral pixels A1 to A4 and A6 to A9 has the gray scale value higher than zero (0) corresponding to the text, the gray scale value of the pixel A5 is changed to the gray scale value of the any one of the peripheral pixels A1 to A4 and A6 to A9. As described above, the max filter 230 performs a function of removing the image and the text, which are smaller than the predetermined size.

The second image signal IMG2, from which the image and the text smaller than the predetermined size are removed by the max filter 230, is applied to the second low-pass filter 240. Since the cut-off frequency of the second low-pass filter 240 is set to a minimum level, the noise component included in the second image signal IMG2 is effectively removed.

FIG. 4 shows the three-by-three kernel, but the size of kernel used in the max filter 230 may be variously changed. The size of the removed text and image become large in proportion to the size of the kernel. In one exemplary embodiment, for example, where the size of the kernel is five-by-five, a larger sized text may be removed as compared to the three-by-three kernel.

The high-pass filter 250 extracts edge component of the third image signal IMG3 from the second low-pass filter 240 and outputs the extracted edge component as the fourth image signal IMG4.

The image synthesizer 260 synthesizes the first image signal IMG1 from the first low-pass filter 220 and the fourth image signal IMG4 from the high-pass filter 250. In such an embodiment, the cut-off frequency of the first low-pass filter 220 is relatively high, and a staircase noise component is thereby reduced. In such an embodiment, the cut-off frequency of the second low-pass filter 240 is relatively low, and the second low-pass filter 240 thereby effectively minimizes the noise component of the image and reduces the blurring phenomenon on at image of the small size character, the fine line, and the boundary of a pupil, for example. In such an embodiment, when the text and image that are smaller than the predetermined size are removed by the max filter 230, the edge component, e.g., the fourth image signal IMG4, output from the second low-pass filter 240 and the high-pass filter 250 includes only images larger than the predetermined size.

Accordingly, the noise component is removed from the image displayed in the display panel shown in FIG. 1 by the data signal DATA output from the image synthesizer 260, and the display quality of the edge of the image is substantially enhanced.

Figure 6A:
FIGS. 6A, 7A and 8A are views showing images corresponding to first image signals output from the first low-pass filter shown in FIG. 2.
Figure 6B:
FIGS. 6B, 7B and 8B are views showing images corresponding to data signals output from an image synthesizer shown in FIG. 2.
Figure 7A:
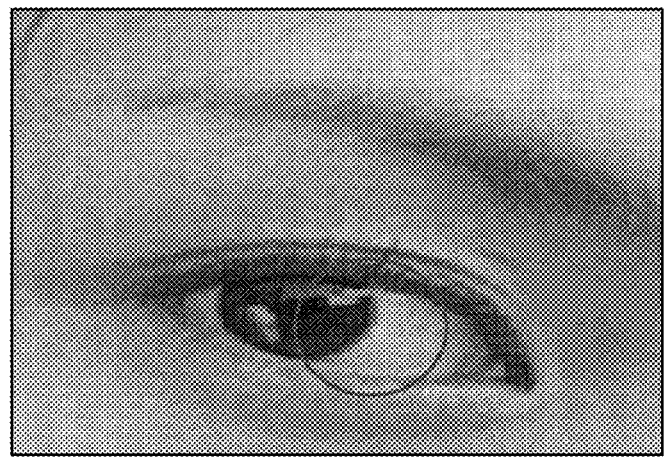
Figure 7B:
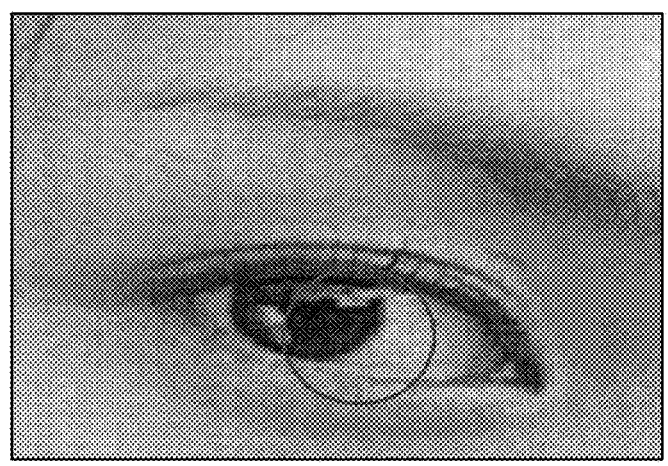
Figure 8A:
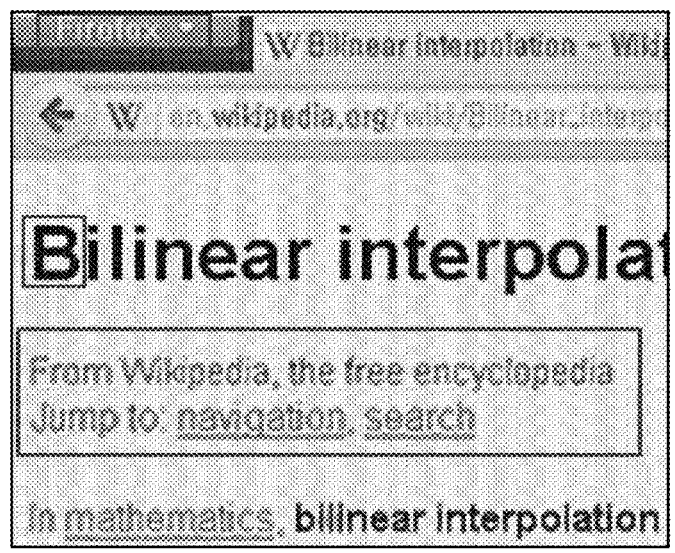
Figure 8B:

FIGS. 6A, 7A and 8A are views showing images corresponding to first image signals output from the first low-pass filter shown in FIG. 2, and FIGS. 6B, 7B and 8B are views showing images corresponding to data signals output from an image synthesizer shown in FIG. 2.

As shown in FIGS. 2, 6A, 7A and 8A, images of the small size character, the fine line (e.g., hair) and the boundary of a pupil are blurry in the images output from the first low-pass filter 220.

In an exemplary embodiment, as shown in FIGS. 2, 6B, 7B and 8B, the fourth image signal IMG4, e.g., the edge component, which is obtained by passing through the max filter 230, the second low-pass filter 240 and the high-pass filter 250, is synthesized with the images output from the first low-pass filter 220, and image of the small size character, the fine line and the boundary of a pupil are displayed substantially clearly, and the display quality of the image displayed in the display panel 110 is thereby substantially improved.

FIG. 9 is a flowchart showing an exemplary embodiment of an image processing method of the timing controller shown in FIG. 1. For the convenience of description, the image processing method of the timing controller will be described with reference to the configuration of the timing controller 120 shown in FIG. 2.

Referring to FIGS. 2 and 9, the gray scale converter 210 of the timing controller 120 converts the image signals RGB from the external source (not shown) to the gray scale signal GRY corresponding to the gray scale (S300).

The first low-pass filter 220 performs a low-pass filtering function on the gray scale signal GRY to output the first image signal IMG1 (S310).

The max filter 230 filters the gray scale signal GRY using the kernel with the predetermined size (S320). The max filter 230 converts the gray scale signal GRY corresponding to the pixel located at the center portion of the kernel to the gray scale signal having the largest gray scale value in the kernel to output the image signal IMG2.

The second low-pass filter 230 performs a low-pass filtering function on the second image signal IMG2 to output the third image signal IMG3 (S330). In such an embodiment, the cut-off frequency of the second low-pass filter 230 is lower than the cut-off frequency of the first low-pass filter 220.

The high-pass filter 250 performs a high-pass filtering function to extract the edge component of the third image signal IMG3 and outputs the fourth image signal IMG4 (S340).

The image synthesizer 260 synthesizes the first image signal IMG1 from the first low-pass filter 220 and the fourth image signal IMG4 from the high-pass filter 250.

In such an embodiment, the timing controller 120 attenuates the noise component included in the image signal RGB from the external source (not shown) and enhances the edge of the object, and thus the image quality of the image displayed in the display panel 110 is substantially improved.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. An image processing device comprising:
    a first low-pass filter which filters an image signal to output a first image signal using a first cut-off frequency;
    a max filter which receives the image signal and outputs an image signal having the largest gray scale value among the image signals corresponding to a predetermined pixel and a plurality of peripheral pixels adjacent to the predetermined pixel as a second image signal;
    a second low-pass filter which receives the second image signal from the max filter and filters the second image signal to output a third image signal using a second cut-off frequency;
    a high-pass filter which receives the third image signal from the second low-pass filter and filters the third image signal to output a fourth image signal; and
    an image synthesizer which synthesizes the first image signal from the first low-pass filter and the fourth image signal from the high-pass filter to output a data signal,
    wherein the second cut-off frequency of the second low-pass filter is lower than the first cut-off frequency of the first low-pass filter.

2. The image processing device of claim 1, wherein the max filter outputs an image signal having the largest gray scale value among the image signals corresponding to three-by-three pixels, in which the predetermined pixel is a center pixel of the three-by-three pixels, as the second image signal.

3. The image processing device of claim 1, further comprising:
    a gray scale converter which coverts an input image signal including red data, green data and blue data to a gray scale signal.

4. A display device comprising:
    a display panel comprising:
        a plurality of gate lines;
        a plurality of data lines; and
        a plurality of pixels, wherein each of the pixels is connected to a corresponding gate line of the gate lines and a corresponding data line of the data lines;
    a gate driver which drives the gate lines;
    a data driver which drives the data lines; and
    a timing controller which receives an image signal, applies a data signal and a first control signal to the data driver, and applies a second control signal to the gate driver,
    wherein the timing controller comprises an image processing device which converts the image signal to the data signal, and
    wherein the image processing device comprises:
        a first low-pass filter which filters the image signal to output a first image signal using a first cut-off frequency;
        a max filter which receives the image signal and outputs an image signal having the largest gray scale value among the image signals corresponding to a predetermined pixel and a plurality of peripheral pixels adjacent to the predetermined pixel as a second image signal;
        a second low-pass filter which receives the second image signal from the max filter and filters the second image signal to output a third image signal using a second cut-off frequency;
        a high-pass filter which receives the third image signal from the second low-pass filter and filters the third image signal to output a fourth image signal; and
        an image synthesizer which synthesizes the first image signal from the first low-pass filter and the fourth image signal from the high-pass filter to output a data signal,
        wherein the second cut-off frequency of the second low-pass filter is lower than the first cut-off frequency of the first low-pass filter.

5. The display device of claim 4, wherein the max filter outputs an image signal having the largest gray scale value among the image signals corresponding to three-by-three pixels, in which the predetermined pixel is a center pixel of the three-by-three pixels, as the second image signal.

6. The display device of claim 4, further comprising:
    a gray scale converter which coverts an input image signal including red data, green data and blue data to a gray scale signal.

7. A method of processing an image, the method comprising:
    converting an image signal to a gray scale image signal;
    outputting a first image signal by performing a first low-pass filtering by a first low pass filter on the gray scale image signal using a first cut-off frequency;
    outputting a second image signal by performing a max filtering on the gray scale image signal;
    outputting a third image signal by performing a second low-pass filtering by a second low pass filter on the second image signal using a second cut-off frequency;
    outputting a fourth image signal by performing a high-pass filtering on the third image signal; and
    synthesizing the first image signal, which is directly output from the first low pass filter, and the fourth image signal to generate a data signal,
    wherein the outputting the second image signal by performing the max filtering on the image signal comprises outputting an image signal having the largest gray scale value among image signals corresponding to a predetermined pixel and a plurality of peripheral pixels adjacent to the predetermined pixel as the second image signal, and
    wherein the second cut-off frequency of the second low-pass filtering is lower than the first cut-off frequency of the first low-pass filtering.

8. The method of claim 7 wherein the converting the image signal to the gray scale image signal comprising:
    converting the image signal including red data, green data and blue data to a gray scale image signal.

\* \* \* \* \*